Jan. 27, 1953
J. D. MINER, JR., ET AL
2,627,038
ELECTRICAL POWER SYSTEM FOR AIRCRAFT
Filed Sept. 15, 1950
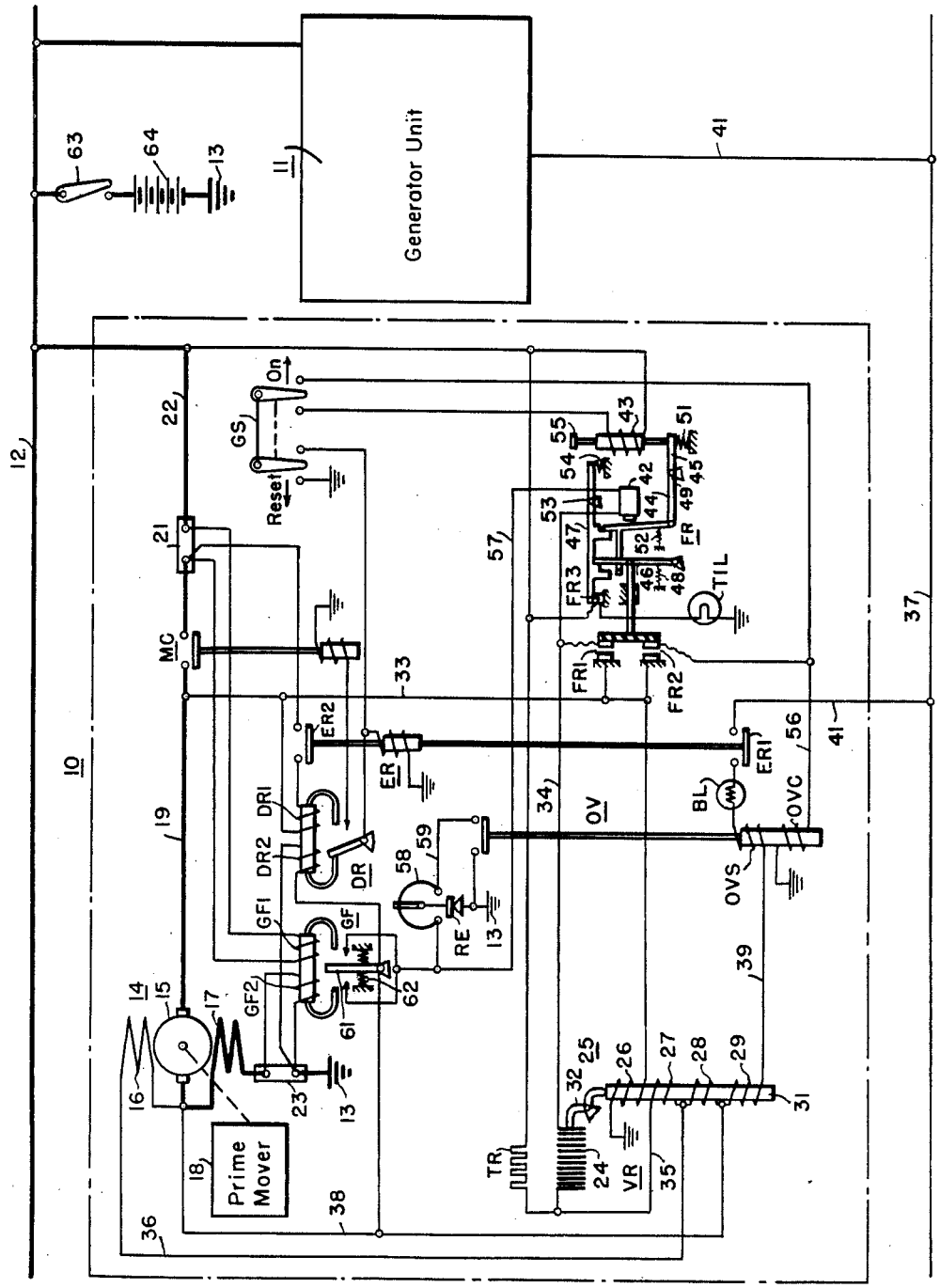
WITNESSES:
E. A. McCloskey.
Wm. L. Groves
INVENTORS
John D. Miner, Jr., Bascum O. Austin
and Ralph D. Jessee.
BY
ATTORNEY Patented Jan. 27, 1953

2,627,038

UNITED STATES PATENT OFFICE 2,627,038

ELECTRICAL POWER SYSTEM FOR AIRCRAFT

John D. Miner, Jr., Bascum O. Austin, and Ralph D. Jessee, Lima, Ohio, assignors to Westinghouse Electric Corporation, East Pittsburgh, Pa., a corporation of Pennsylvania Application September 15, 1950, Serial No. 185,098

12 Claims. (Cl. 307—87)

Our invention relates, generally, to power systems and, more particularly, to electrical power systems for aircraft.

The reversal of the polarity of one or more of the generators in a multi-generator electrical power system for aircraft presents a serious problem. It is possible that a generator may lose its residual magnetism for various reasons and reverse generator polarity may occur. A generator which has reverse polarity with respect to a bus must not be connected to the bus since that would provide a direct short circuit through the generator. Prior systems have permitted the generator to operate at full voltage with reverse polarity but have prevented it from being connected to the bus.

An object of our invention is to provide a simplified means for preventing a generator having reverse polarity from being connected to a bus.

Another object of our invention is to provide for automatically correcting the polarity of a generator having reverse polarity.

A further object of our invention is to reduce the voltage applied to the actuating coil of a differential relay utilized in the control system for an electrical power system for aircraft.

A still further object of our invention is to provide a simplified means for controlling the resetting of a field relay of the latched type.

Still another object of our invention is to automatically reduce the voltage of a generator having reverse polarity.

A more general object of our invention is to provide an auxiliary electric power system for aircraft which shall be simple and efficient in operation and which may be economically manufactured and installed.

Other objects of our invention will be explained fully hereinafter or will be apparent to those skilled in the art.

In accordance with our invention, a field relay of the latched type is provided for each generator of a multi-generator power system for aircraft. The primary purpose of the field relay is to disconnect the generator shunt field from the positive feeder in case any fault occurs. The relay is provided with a simple trip-free reset mechanism, which does not require auxiliary relays to make it electrically trip-free. A rectifier is so connected in the control system that the field relay is tripped when the generator voltage builds up with reverse polarity. Contact members on an equalizer relay open the circuit of a differential relay coil which is connected across the switch for connecting the generator to the bus, thereby reducing the voltage on the coil during a reverse polarity condition.

For a better understanding of the nature and objects of the invention, reference may be had to the following detailed description taken in conjunction with the accompanying drawing in which the single figure is a diagrammatic view of a power and control system embodying the principal features of the invention.

Referring to the drawing, the system shown therein comprises two generator units 10 and 11, which are disposed to be connected in parallel-circuit relation between a power or load bus 12 and ground 13. More than two generator units may be utilized if desired. However, since the generator units are similar in construction and operation, only one unit is shown and described in detail in the present application.

As shown, the unit 10 comprises a direct-current generator 14 having an armature winding 15, a shunt field winding 16, and a series field winding 17. The generator 14 may be driven by one of the engines of an airplane or any other suitable prime mover 18.

The positive terminal of the generator 14 may be connected to the load bus 12 through a feeder circuit, which comprises a conductor 19, a main switch or contactor MC, a shunt 21, and a conductor 22. The negative terminal of the generator is connected to the ground 13 through the series field winding 17 and a shunt 23.

A voltage regulator VR is provided for maintaining a substantially constant generator voltage. The regulator VR controls the energization of the shunt field winding 16 in a manner well known in the art. The regulator comprises a carbon pile or stack 24, which may be compressed by a solenoid mechanism 25 having a main coil 26, a neutralizing coil 27, a stabilizing coil 28, and an equalizing coil 29 acting on a core 31. The solenoid mechanism 25 acts on the carbon pile 24 through a lever mechanism 32 to vary the pressure on the pile and thus vary its resistance.

The circuit for the shunt field winding 16 of the generator extends from the power conductor 19 through a conductor 33, contact members FR1 of a field relay FR, conductor 34, the carbon pile 24, conductor 35, the neutralizing coil 27, and a conductor 36 to one terminal of the shunt field winding 16. The other terminal of the field winding 16 is connected to the negative terminal of the generator.

The main coil 26 of the voltage regulator VR is connected across the generator voltage, by the conductor 33, and actuates the regulator to maintain the desired voltage. The equalizer coil 29 is provided to maintain the desired load division between a plurality of generators connected in parallel to the bus 12. It will be understood that each generator has its own voltage regulator, and load division between the several generators is controlled by equalizer coils on the regulators which are connected to a common equalizer bus 37. The equalizer coil of each regulator is energized in accordance with the load of its generator, indicated by the voltage across the series field, and in case of improper load division, a current will flow in the equalizer bus which varies the energization of the equalizer coils to cause the regulators to act to restore the proper division of load. The equalizer coil 29 is shown as being connected in a circuit which extends from the negative terminal of the generator 14 through a conductor 38, the coil 29, a conductor 39, coil OVS of an overvoltage relay OV, a ballast lamp BL, contact members ER1 of an equalizer relay ER, and a conductor 41 to the equalizer bus 37.

As mentioned hereinbefore, the circuit for the shunt field winding 16 of the generator is controlled by the contact members FR1 of the field relay FR. The field relay may be of any suitable type but it is preferred to utilize a latched type relay of the type described in the copending application of B. O. Austin, Serial No. 179,054, filed August 12, 1950. The relay FR comprises a trip coil 42, a reset coil 43, an armature 44, a reset member 45, a latching member 46, and a latching bar 47. The contact members FR1 and FR2 are actuated by the latching member 46, which is biased in one direction by a spring 48 and is actuated in the other direction by the armature 44. The armature 44 is pivotally mounted on the reset member 45, which, in turn, is pivoted at 49 and is biased in one direction by a spring 51. The armature 44 is biased in one direction by a spring 52 and is actuated in the other direction by the trip coil 42. The latching bar 47 is pivoted at 53 and biased by a spring 54 to the position shown in the drawing, which is the tripped position of the relay.

As shown, the latching bar 47 engages the latching member 46 to retain the contact members of the relay in the open position. The relay may be reset by energizing the reset coil 43, which causes the reset member 45 to raise the armature 44, thereby actuating the latching bar 47 to a position in which the latching member 46 is released to permit the contact members to be closed by the spring 48. The relay may be manually reset by pushing downwardly on a reset button 55 to actuate the reset member 45 in the same manner as when the reset coil 43 is energized. An indicating lamp TIL is energized through contact members FR3 of the relay to indicate when the relay is in the tripped position.

In addition to controlling the energizing circuit for the field winding 16 of the generator, the relay FR also functions to partially establish the energizing circuit for the actuating coil of the main switch MC, which connects the generator to the load bus 12, as previously explained. Thus, whenever the field relay FR is tripped, the generator is disconnected from the load bus 12, and the circuit for its field winding 16 is opened.

In order to protect against overvoltage conditions, each generator is provided with the overvoltage relay OV, which is connected to be responsive to the generator voltage. In addition to the coil OVS previously mentioned, the relay OV is provided with a coil OVC, which is connected between ground and the positive terminal of the generator 14 through a conductor 56, the contact members FR2 of the relay FR, and conductors 33 and 19 to the generator 14, so that the coil OVC is connected directly across the generator voltage.

The coil OVC is the main operating coil of the relay OV and actuates it to close its contact when the generator voltage exceeds a predetermined value. The coil OVS is a biasing coil excited by the equalizer current and is provided to obtain proper selectivity in a multi-generator system, so that only the particular generator which is causing overvoltage will be disconnected from the bus, as more fully described and claimed in our copending application Serial No. 179,055, filed August 12, 1950, now Patent No. 2,590,265.

The contact members of the relay OV establish an energizing circuit for the trip coil 42 when the relay is actuated. The circuit for the trip coil 42 extends from the conductor 34, through the trip coil 42, conductor 57, a rheostat 58, conductor 59, and the contact members of the relay OV to ground.

It is possible that the generator may lose its residual magnetism for various reasons, thereby making it possible for the polarity of the generator to be reversed. In prior systems, a polarized relay has been provided to prevent a generator having reversed polarity from being connected to the main bus.

In the present system, the generator is prevented from being connected to the bus, and the field relay is tripped, thereby removing excitation from the generator and reducing the generator voltage. Also, provision is made for energizing the field winding from the main bus 12 through a tickler resistor TR to correct the polarity of the generator.

If the polarity of the generator becomes reversed, the trip coil 42 of the relay FR is energized through a rectifier RE, which is so connected in the system that the relay FR is tripped if the generator 14 builds up a voltage having a reversed polarity. In the event of reversed polarity, the circuit through the trip coil 42 extends from the one terminal of the generator 14 through the series field winding 17, the shunt 23, ground 13, the rectifier RE, a portion of the rheostat 58, conductor 57, the trip coil 42, conductor 34, contact members FR1 and conductors 33 and 19, to the other terminal of the generator 14. It will be seen that the trip coil 42 is thus connected directly across the generator in series with the rectifier RE, so that when the polarity of the generator is normal, the rectifier prevents current flow through the trip coil. If the generator polarity becomes reversed, however, the rectifier permits current to flow through the coil 42 to trip the field relay.

Each generator in the system is also protected against reversed current flowing through the generator. In case of persistent overvoltage of any one generator in the system, reverse current will flow through those generators which are being regulated for normal voltage. A polarized relay DR is provided for protecting the generator 14 against reverse current.

As shown, the relay DR is provided with a coil DR2, which is connected across the series field winding 17 of the generator, thereby being responsive to reverse current in the generator series field winding. The relay is provided with another coil DR1, which is connected between the generator power conductor 19 and the load bus 12. Thus, the coil DR1 is energized by the difference between the voltage of the generator and the voltage of the bus 12.

As shown, the contact members of the relay DR are connected in the energizing circuit for the main switch MC; therefore, the main switch cannot be closed to connect the generator to the bus unless the generator voltage is slightly higher than the bus voltage to energize the coil DR1 in the proper direction to actuate the polarized relay DR. Furthermore, the contact members of the relay DR are opened to deenergize the main switch MC and disconnect the generator from the bus in case the coil DR2 is energized by a reverse current as previously explained.

It will be noted that contact members ER2 of the equalizer relay ER are connected in the circuit for the coil DR1 of the relay DR. Since the energization of the coil of the relay ER is controlled by the field relay FR, the contact members ER2 are opened in the event that the field relay FR is tripped by reverse polarity in the manner hereinbefore explained. Thus, the circuit for the coil of the relay DR is opened during reverse polarity, thereby reducing the voltage impressed upon this coil during reverse polarity conditions. In this manner, a relay having a standard coil similar to the other coils in the system may be utilized, thereby decreasing the weight and cost of the relay.

Protection against ground faults occurring in the generator, its leads, or its feeder cables, is accomplished by means of a polarized relay GF, which is provided with one coil GF1 connected across the shunt 21 and another coil GF2 connected across the shunt 23. Thus, the relay is responsive to a difference between current flowing into the negative generator terminal and current flowing into the main bus.

The contact members of the relay GF are connected to cause the energization of the trip coil 42 of the field relay FR when either contact member is closed. It will be noted that the contact member 61 of the relay GF is normally biased to its midposition by springs 62. It remains in this position so long as the currents in the coils GF1 and GF2 are substantially equal, but is actuated in one direction or the other to close a circuit for the trip coil 42, through the conductors 38 and 57, if the currents in the two coils become unequal or if one of the leads to the coils should become broken.

A manually operable switch GS is provided for controlling the energization of the reset coil 43 of the relay FR. This switch may also be utilized to cause the main contactor MC to be opened to disconnect the generator from the load bus 12.

The operation of the system may be briefly described as follows. Assuming that the generator 14 is being driven by the prime mover 18 and that a switch 63 is closed to connect a battery 64 to the bus 12, the relay FR may be closed by actuating the switch GS to the "reset" position, thereby energizing the reset coil 43. When the contact members of the relay FR are closed, the switch GS is actuated to the "on" position where it remains during normal operation of the system.

As explained hereinbefore, the closing of the contact members FR1 of the relay FR establishes an energizing circuit for the shunt field winding 16 of the generator 14, thereby permitting the voltage of the generator to build up. The voltage is controlled by the voltage regulator VR. When the generator voltage is slightly greater than the bus voltage the contact members of the relay DR are closed to complete the energizing circuit for the coil of the switch MC, which extends from the coil through the contacts of the relay DR, the switch GS, and the field relay contacts FR2, to the conductor 33. The switch MC is thus energized and closes its contacts, connecting the generator 14 to the bus 12. The system is now in its normal operating condition.

As described hereinbefore, the field relay FR is tripped upon the occurrence of an overvoltage condition which causes the operation of the relay OV, or a fault in the generator or feeder circuits which causes the operation of the relay GF. Tripping of the field relay opens its contacts FR1 and FR2 and thus causes the main switch MC to open to disconnect the generator from the bus, and opens the circuit of the shunt field winding 16 to remove excitation from the generator.

If the generator voltage builds up with reversed polarity, or if the polarity of the generator reverses during operation, for any reason, the rectifier RE permits current to flow from the generator through the trip coil 42 so that the field relay FR is immediately tripped. Thus, in case of reverse generator polarity, the generator is immediately disconnected from the bus, or prevented from being connected to the bus, and excitation is removed from the generator. The coil DR1 of the polarized relay is protected from the relatively high voltage that may exist between the bus and the generator by the contact ER2 of the equalizer relay ER, which opens when the relay ER is deenergized by tripping of the field relay. The shunt field winding 16 of the generator is connected directly to the bus 12 through a trickler resistor TR which allows a small current to flow through the field winding when the generator is disconnected from the bus. This current energizes the field winding in the correct direction and thus reestablishes the proper residual magnetism of the generator, so that the generator voltage will build up with correct polarity when the field relay is reset, and the generator can then be connected to the bus in the manner described above.

If the generator is disconnected by the operation of the field relay FR, it cannot be reconnected to the bus until after the field relay has been reset by operating the switch GS to energize the reset coil 43, or by manually resetting the relay in the manner previously explained.

If the generator is disconnected from the bus by the operation of the relay DR as a result of a reverse current flowing through the generator, it will be automatically reconnected to the bus when the generator again develops sufficient voltage to prevent reverse current from flowing through the generator from the bus 12.

From the foregoing description, it is apparent that we have provided a control system which prevents a generator from being connected to its load bus in case of reverse polarity of the generator and which provides for correcting the polarity of the generator. The present system also reduces the voltage impressed upon certain relays in the system, thereby making it possible to utilize standard relays similar to the other relays in the system. The required functions are performed with a minimum amount of apparatus, thereby simplifying the system.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. A control and protective system for a direct current generator having a field winding, said system including switch means for connecting the generator to a load bus, means responsive to the polarity of the generator for effecting opening of the switch means and interruption of the circuit of the generator field winding in response to reversed polarity of the generator, and means for permanently connecting the field winding to said bus independently of the switch means for energization directly from the bus to correct the polarity of the generator if the polarity becomes reversed.

2. A control and protective system for a direct current generator having a field winding, said system including switch means for connecting the generator to a load bus, relay means for controlling said switch means and for controlling the circuit of the generator field winding, means responsive to the polarity of the generator for actuating said relay means to effect opening of the switch means and interruption of the circuit of the generator field winding in response to reversed polarity of the generator, and means independent of the relay means and of the switch means for permanently connecting the field winding to said bus to be energized directly from the bus to correct the polarity of the generator if the polarity becomes reversed.

3. A control and protective system for a direct current generator having a field winding, said system including switch means for connecting the generator to a load bus, relay means for controlling said switch means and for controlling the circuit of the generator field winding, means responsive to the polarity of the generator for actuating said relay means to effect opening of the switch means and interruption of the circuit of the generator field winding in response to reversed polarity of the generator, a resistor, and means for permanently connecting said resistor between the field winding and said bus independently of the switch means to energize the field winding directly from the bus to correct the polarity of the generator if the polarity becomes reversed.

4. A control and protective system for a direct current generator having a field winding, said system including switch means for connecting the generator to a load bus, relay means for controlling said switch means and for controlling the circuit of the generator field winding, unidirectionally conductive means responsive to the polarity of the generator for actuating said relay means to effect opening of the switch means and interruption of the circuit of the generator field winding, and means independent of the relay means and of the switch means for permanently connecting the field winding to said bus to be energized directly from the bus to correct the polarity of the generator if the polarity becomes reversed.

5. A control and protective system for a direct current generator having a field winding, said system including switch means for connecting the generator to a load bus, relay means for controlling said switch means and for controlling the circuit of the generator field winding, said relay means including an actuating coil for actuating the relay means to effect opening of the switch means and interruption of the circuit of the generator field winding, circuit means for energizing said actuating coil from the generator voltage, said circuit means including a rectifier connected to prevent current flow to the coil when the polarity of the generator is normal and to permit energization of the coil if the polarity of the generator becomes reversed, and means independent of the relay means and of the switch means for permanently connecting the field winding to the bus to be energized directly from the bus to correct the polarity of the generator if the polarity becomes reversed.

6. A control and protective system for a direct current generator having a field winding, said system including switch means for connecting the generator to a load bus, relay means for controlling said switch means and for controlling the circuit of the generator field winding, said relay means including an actuating coil for actuating the relay means to effect opening of the switch means and interruption of the circuit of the generator field winding, circuit means for energizing said actuating coil from the generator voltage, said circuit means including a rectifier connected to prevent current flow to the coil when the polarity of the generator is normal and to permit energization of the coil if the polarity of the generator becomes reversed, a resistor, and means for permanently connecting said resistor between the field winding and the bus independently of the switch means to energize the field winding directly from the bus to correct the polarity of the generator if the polarity becomes reversed.

7. A control and protective system for a direct current generator having a field winding, said system including switch means for connecting the generator to a load bus, a polarized relay having an actuating coil connected to be responsive to the voltage difference between the generator and the bus, a latching relay, the polarized relay and the latching relay jointly controlling the switch means, and the latching relay also controlling the circuit of the generator field winding, means responsive to the polarity of the generator for effecting operation of the latching relay to effect opening of the switch means and interruption of the circuit of the generator field winding in response to reversed polarity of the generator, and a third relay having an operating coil controlled by the latching relay, said third relay having a contact connected in the circuit of the actuating coil of the polarized relay and being adapted to open its contact and interrupt the circuit of said actuating coil upon operation of the latching relay.

8. A control and protective system for a direct current generator having a field winding, said system including switch means for connecting the generator to a load bus, a polarized relay having an actuating coil connected to be responsive to the voltage difference between the generator and the bus, a latching relay, the polarized relay and the latching relay jointly controlling the switch means, and the latching relay also controlling the circuit of the generator field winding, said latching relay having a trip coil for effecting operation of the latching relay to effect opening of the switch means and interruption of the circuit of the generator field winding, a rectifier, and means for connecting said trip coil to the generator voltage in series with said rectifier, the rectifier being connected to prevent energization of the trip coil when the polarity of the generator is normal and to permit energization of the coil if the polarity of the generator becomes reversed, and means for interrupting the circuit of the actuating coil of the polarized relay upon operation of the latching relay.

9. A control and protective system for a direct current generator having a field winding, said system including switch means for connecting the generator to a load bus, a polarized relay having an actuating coil connected to be responsive to the voltage difference between the generator and the bus, a latching relay, the polarized relay and the latching relay jointly controlling the switch means, and the latching relay also controlling the circuit of the generator field winding, said latching relay having a trip coil for effecting operation of the latching relay to effect opening of the switch means and interruption of the circuit of the generator field winding, a rectifier, and means for connecting said trip coil to the generator voltage in series with said rectifier, the rectifier being connected to prevent energization of the trip coil when the polarity of the generator is normal and to permit energization of the coil if the polarity of the generator becomes reversed, and a third relay having an operating coil controlled by the latching relay, said third relay having a contact connected in the circuit of the actuating coil of the polarized relay and being adapted to open its contact and interrupt the circuit of said actuating coil upon operation of the latching relay.

10. A control and protective system for a direct current generator having a field winding, said system including switch means for connecting the generator to a load bus, a polarized relay having an actuating coil connected to be responsive to the voltage difference between the generator and the bus, a latching relay, the polarized relay and the latching relay jointly controlling the switch means, and the latching relay also controlling the circuit of the generator field winding, said latching relay having a trip coil for effecting operation of the latching relay to effect opening of the switch means and interruption of the circuit of the generator field winding, a rectifier, and means for connecting said trip coil to the generator voltage in series with said rectifier, the rectifier being connected to prevent energization of the trip coil when the polarity of the generator is normal and to permit energization of the coil if the polarity of the generator becomes reversed, means for interrupting the circuit of the actuating coil of the polarized relay upon operation of the latching relay, and means independent of the latching relay for connecting the generator field winding to the bus to be energized thereby.

11. A control and protective system for a direct current generator having a field winding, said system including switch means for connecting the generator to a load bus, relay means for controlling said switch means and for controlling the circuit of the generator field winding, said relay means being normally held in one position and having tripping means for actuating the relay means to another position to effect opening of the switch means and deenergization of the field winding, and means for energizing said tripping means to actuate the relay means, said energizing means including unidirectionally conductive means connected in series with the tripping means to energize the tripping means if the polarity of the generator becomes reversed.

12. A control and protective system for a direct current generator having a field winding, said system including switch means for connecting the generator to a load bus, relay means for controlling said switch means and for controlling the circuit of the generator field winding, said relay means being normally held in one position and having tripping means for actuating the relay means to another position to effect opening of the switch means and deenergization of the field winding, and means for energizing said tripping means to actuate the relay means, said energizing means including a rectifier connected in series between the generator and the tripping means, said rectifier being connected to block current flow from the generator to the tripping means when the generator has normal polarity and to permit energization of the tripping means if the polarity of the generator becomes reversed.

JOHN D. MINER, Jr.
BASCUM O. AUSTIN.
RALPH D. JESSEE.

REFERENCES CITED

The following references are of record in the file of this patent:

UNITED STATES PATENTS

| Number | Name | Date |
|---|---|---|
| 2,053,218 | Frese | Sept. 1, 1936 |
| 2,155,229 | Hoffman | Apr. 18, 1939 |
| 2,483,117 | Almassy | Sept. 27, 1948 |
| 2,522,601 | Brown | Sept. 19, 1950 |
| 2,534,895 | Austin et al. | Dec. 19, 1950 |